(12) United States Patent
Caldwell et al.

(10) Patent No.: US 12,168,473 B2
(45) Date of Patent: Dec. 17, 2024

(54) STEERING WHEEL OVERLAY SIGNAL METHOD AND APPARATUS

(71) Applicant: JAGUAR LAND ROVER LIMITED, Coventry (GB)

(72) Inventors: Robyn Caldwell, Coventry (GB); Gareth Davies, Coventry (GB); Denis Fusconi, Coventry (GB); Kieron Stanger, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 324 days.

(21) Appl. No.: 17/753,619

(22) PCT Filed: Sep. 9, 2020

(86) PCT No.: PCT/EP2020/075244
§ 371 (c)(1),
(2) Date: Mar. 9, 2022

(87) PCT Pub. No.: WO2021/048234
PCT Pub. Date: Mar. 18, 2021

(65) Prior Publication Data
US 2022/0297756 A1    Sep. 22, 2022

(30) Foreign Application Priority Data

Sep. 10, 2019 (GB) .................. 1913002

(51) Int. Cl.
*B62D 15/02* (2006.01)
*B60W 10/20* (2006.01)
*B60W 30/12* (2020.01)

(52) U.S. Cl.
CPC .......... *B62D 15/025* (2013.01); *B60W 10/20* (2013.01); *B60W 30/12* (2013.01); *B62D 15/029* (2013.01);
(Continued)

(58) Field of Classification Search
CPC ... B62D 15/025; B62D 15/029; B60W 10/20; B60W 30/12; B60W 2510/202; B60W 2552/53; B60W 2710/202
See application file for complete search history.

(56) References Cited

U.S. PATENT DOCUMENTS 5,765,116 A * 6/1998 Wilson-Jones ...... G05D 1/0246
340/439
6,473,678 B1 * 10/2002 Satoh .................. G05D 1/0246
340/439
(Continued)

FOREIGN PATENT DOCUMENTS

JP         2017202773 A    11/2017

OTHER PUBLICATIONS

Great Britain Intellectual Property Office, Combined Search and Examination Report under Sections 17 and 18(3) Issued in Application No. GB1913002.0, Jun. 8, 2020, 12 pages.
(Continued)

*Primary Examiner* — Thomas Ingram
(74) *Attorney, Agent, or Firm* — McCoy Russell LLP

(57) ABSTRACT

The present disclosure relates to a control system for controlling generation of a steering wheel overlay signal to control a trajectory of a host vehicle. The control system includes one or more controllers. The control system is configured to determine a principal axis of a lane of travel. A target trajectory is determined for the host vehicle in dependence on the determined principal axis. The steering wheel overlay signal is generated, including an intra-lane steering signal for aligning the trajectory of the host vehicle with the target trajectory. The intra-lane steering signal is removed when the trajectory is at least substantially aligned with the target trajectory. The present disclosure also relates
(Continued)

to a vehicle; and a method of controlling generation of a steering wheel overlay signal.

11 Claims, 7 Drawing Sheets

(52) U.S. Cl.
CPC ... *B60W 2510/202* (2013.01); *B60W 2552/53* (2020.02); *B60W 2710/202* (2013.01)

(56) References Cited

U.S. PATENT DOCUMENTS

| | | | |
|---|---|---|---|
| 2013/0274985 A1* | 10/2013 | Lee | B62D 15/025 |
| | | | 701/23 |
| 2015/0225017 A1 | 8/2015 | Takeda | |
| 2016/0176400 A1* | 6/2016 | Nakano | B62D 15/025 |
| | | | 701/41 |
| 2016/0236712 A1* | 8/2016 | Shirakata | B62D 15/029 |
| 2018/0009437 A1* | 1/2018 | Ooba | B60W 30/10 |
| 2018/0086341 A1 | 3/2018 | Taniguchi | |
| 2020/0023843 A1* | 1/2020 | Van Dan Elzen | B62D 6/00 |

OTHER PUBLICATIONS

ISA European Patent Office, International Search Report and Written Opinion Issued in Application No. PCT/EP2020/075244, Oct. 5, 2020, WIPO, 13 pages.
Great Britain Intellectual Property Office, Examination Report under Section 18(3) Issued in Application No. GB1913002.0, Jan. 31, 2022, 3 pages.

* cited by examiner

STEERING WHEEL OVERLAY SIGNAL METHOD AND APPARATUS

CROSS REFERENCE TO RELATED APPLICATIONS

The present application is a U.S. National Phase of International Application No. PCT/EP2020/075244 entitled "STEERING WHEEL OVERLAY SIGNAL METHOD AND APPARATUS," and filed on Sep. 9, 2020. International Application No. PCT/EP2020/075244 claims priority to Great Britain Patent Application No. 1913002.0 filed on Sep. 10, 2019. The entire contents of each of the above-listed applications are hereby incorporated by reference for all purposes.

TECHNICAL FIELD

The present disclosure relates to a steering wheel overlay signal method and apparatus. Aspects of the disclosure relate to a control system for controlling generation of a steering wheel overlay signal; to a vehicle; to a method of generating a steering wheel overlay signal; computer software and a non-transitory computer-readable medium.

BACKGROUND AND SUMMARY

It is known to provide a vehicle, such as an automobile, with a lane keep assist system. Current lane keep assist systems trigger a steering intervention to bring the driver back to a lane without considering the final position or trajectory. The steering torque intervention will conclude when a distance to lane condition is satisfied. This can result in the driver being positioned in the direction of the opposing lane, and even resulting in a second undesired intervention.

It is an aim of the present disclosure to address one or more of the disadvantages associated with the prior art.

Aspects and embodiments of the disclosure provide a control system, a control system, a vehicle, a method, computer software and a non-transitory computer-readable medium.

According to an aspect of the present disclosure there is provided a control system for controlling generation of a steering wheel overlay signal to control a trajectory of a host vehicle, the control system comprising one or more controllers, the control system configured to determine a principal axis of a lane of travel; determine a target trajectory for the host vehicle in dependence on the determined principal axis; and generate the steering wheel overlay signal. The steering wheel overlay signal may comprise an intra-lane steering signal for aligning the trajectory of the host vehicle with the target trajectory. The intra-lane steering signal may be generated to control the host vehicle within the lane of travel (as opposed to controlling the host vehicle between lanes, i.e. inter-lane). The control system may be configured to reduce or remove the intra-lane steering signal when the trajectory is at least substantially aligned with the target trajectory. The intra-lane steering signal may comprise or consist of a steering wheel torque for controlling the host vehicle at least substantially to align the trajectory of the host vehicle with the target trajectory. The control system may be configured to reduce or remove the steering wheel overlay signal when the trajectory is at least substantially aligned with the target trajectory.

The steering wheel overlay signal may comprise or consist of a steering wheel torque overlay. The intra-lane steering signal may comprise or consist of an intra-lane steering torque for aligning the trajectory of the host vehicle with the target trajectory.

After a lane keep intervention the vehicle may be brought to a specific trajectory within the lane. Alternatively, or in addition, the vehicle may be brought to a predetermined position within the lane. The predetermined position could be centred in the lane of travel; or offset from a boundary of the lane of travel, for example by a predetermined distance (for example 30 cm). The control system may provide the vehicle with a predetermined trajectory and/or position closer relative to the boundary of the lane of travel. This may reduce the overall duration of an intervention. At least in certain embodiments, this may reduce a distance of travel required to achieve the specific trajectory and/or the predetermined position within the lane. In certain embodiments, the driver assist function may feel less intrusive due to the reduced time period.

The target trajectory and/or the target position for the host vehicle could be determined with reference to a trajectory and/or a position of the host vehicle immediately prior to activation of a driver assist function. For example, the target position could be set to reflect a typical intra-lane position adopted by the driver of the host vehicle.

The steering wheel overlay signal is generated to adjust or control a trajectory of the host vehicle. At least in certain embodiments, the steering wheel overlay signal may be generated as a driver assist control function. By way of example, the driver assist control function may comprise a lane keep assist function or a road edge assist function. The driver assist control function may represent an inter-lane control function. The lane keep assist function may comprise generating the steering wheel overlay signal to maintain the host vehicle in the lane of travel or to return the host vehicle to the lane of travel. The road edge assist function may comprise generating the steering wheel overlay signal to prevent the host vehicle traversing a road edge, thereby maintaining the host vehicle on the road or returning the host vehicle onto the road. The driver assist control function and the intra-lane steering signal may be performed sequentially. The intra-lane steering signal may be generated after performance of the driver assist control function. Alternatively, the intra-lane steering signal may be generated as a continuation or an extension of the driver assist control function.

The driver assist control function may comprise application of a steering wheel torque in a first direction, for example to return the host vehicle to the lane of travel. The intra-lane steering signal may comprise application of a steering wheel torque in a second direction for aligning the trajectory of the host vehicle at least substantially with the target trajectory. The first and second directions may be opposite to each other.

The control system may be configured to determine the intra-lane steering signal in dependence on an angular offset between the trajectory of the host vehicle and the target trajectory. The magnitude and/or the direction of the intra-lane steering signal may be determined in dependence on the angular offset. The intra-lane steering signal may be reduced progressively, for example as the trajectory of the host vehicle approaches the target trajectory. The intra-lane steering signal may be reduced to zero (0) when the trajectory of the host vehicle is substantially aligned with the target trajectory.

The one or more controllers may collectively comprise at least one electronic processor having an electrical input for receiving a signal from one or more sensors on the host vehicle. At least one memory device having instructions stored therein may be electrically coupled to the at least one electronic processor. The at least one electronic processor may be configured to access the at least one memory device and execute the instructions thereon so as to generate the intra-lane steering signal. The at least one electronic processor may be configured to reduce or remove the steering wheel overlay signal when the trajectory is at least substantially aligned with the target trajectory.

The control system may determine when the trajectory is at least substantially aligned with the target trajectory. The determination that the trajectory is at least substantially aligned with the target trajectory may provide an exit condition. The control system may be configured to remove the steering wheel overlay signal when the exit condition is identified.

The intra-lane steering signal may be applied to provide a hand-over or transition function. The intra-lane steering signal may be generated to control the host vehicle such that the trajectory is at least substantially aligned with the target trajectory. The control system may be configured to remove or reduce the intra-lane steering signal when the trajectory is at least substantially aligned with the target trajectory. The intra-lane steering signal may be operable to transition control of the host vehicle back to the driver, for example upon completion of a driver assist control function. By controlling the host vehicle such that the trajectory is at least substantially aligned with the target trajectory, the driver may assume control when the trajectory of the host vehicle is in a predetermined orientation relative to the lane of travel. At least in certain embodiments, the driver workload may be reduced by controlling the host vehicle such that the trajectory is in the predetermined orientation.

The control system may be configured to reduce the steering wheel overlay signal to zero (0) when the trajectory is at least substantially aligned with the target trajectory. Alternatively, the control system may be configured to remove the steering wheel overlay signal when the trajectory is at least substantially aligned with the target trajectory.

The steering wheel overlay signal may be applied as an overlay to a steering assist torque. The steering assist torque may be generated to provide a power steering function. The control system may be configured to generate the steering assist torque, for example in dependence on an input torque made by the driver to a steering wheel of the host vehicle. The steering assist torque may be generated to supplement a steering torque applied to a steering wheel by the driver. As outlined above, the control system may be configured to remove the steering wheel overlay signal when the trajectory is at least substantially aligned with the target trajectory. However, the control system may continue to apply the steering assist torque.

The control system may be configured to determine at least a first boundary of the lane of travel. The lane keep intervention may be triggered in dependence on the determination of at least the first boundary of the lane of travel. The first boundary may comprise a road edge or a road marking, such as a lane marking. The control system may determine the principal axis in dependence on at least the first boundary of the lane of travel. The principal axis may be determined as extending substantially parallel to the determined first boundary. If the determination of at least the first boundary initially triggers the lane keep intervention, the trigger criteria for a road edge may also be met then the principal axis is recalculated.

The control system may be configured to control generation of the steering wheel overlay signal to position the host vehicle at a predetermined distance from the first boundary. For example, the control system may be configured to position a side of the host vehicle 10 cm, 25 cm, 50 cm or 75 cm from the first boundary.

The control system may be configured to determine first and second boundaries of the lane of travel. The first and second boundaries may, for example, represent opposing sides of the lane of travel. The control system may determine the principal axis in dependence on the first and second boundaries of the lane of travel. The principal axis may be determined in dependence on one or both of the first and second boundaries. The principal axis may be determined in dependence on the one of the first and second boundaries identified as being closest to the vehicle (for example, closest to a side of the vehicle or closest to a vehicle centreline).

A scale factor may be applied depending on a determined width of the lane of travel (i.e. the distance between the first and second boundaries) to determine the principal axis. The principal axis may be determined with respect to one or both of the first and second boundaries.

The control system may be configured to control generation of the steering wheel overlay signal to position the host vehicle at a mid-point between the first and second boundaries.

The control system may be configured to determine the or each boundary of the lane of travel by identifying a road marking or a road edge. The road marking may, for example, comprise a lane marking or a road edge marking.

The target trajectory may be substantially parallel to the principal axis of the lane of travel.

The steering wheel overlay signal may comprise a lane assist steering overlay or a road edge assist steering overlay for maintaining the host vehicle within the lane of travel (or returning the host vehicle to the lane of travel). The intra-lane steering signal may be applied after the lane assist steering overlay or the road edge assist steering overlay. The intra-lane steering signal may be applied as a continuation of the lane assist steering overlay or the road edge assist steering overlay. The intra-lane steering signal may be applied immediately after the application of the lane assist steering overlay or the road edge assist steering overlay.

The control system may optionally be configured to generate the steering wheel overlay signal so as to position the host vehicle at a target lane position in the lane of travel. The target lane position may comprise or consist of a target position for the host vehicle within the lane of travel (i.e. an intra-lane target position). The control system may be configured to determine at least one boundary of the lane of travel; and determine a target lane position for the host vehicle in relation to the at least one boundary. The control system may generate the steering wheel overlay signal. The steering wheel overlay signal may comprise an intra-lane steering signal for positioning the host vehicle at the target lane position. The lane position may be defined in a transverse direction extending across the lane of travel, for example perpendicular to the principal axis of the lane of travel. The control system may be configured to reduce or remove the intra-lane steering signal when the host vehicle is at least substantially located at the target lane position.

According to a further aspect of the present disclosure there is provided a control system for controlling generation of a steering wheel overlay signal to control a trajectory of a host vehicle, the control system comprising one or more controllers, the control system configured to determine at least one boundary of a lane of travel; determine a target lane position for the host vehicle in relation to the at least one boundary; and generate the steering wheel overlay signal.

The steering wheel overlay signal may comprise an intra-lane steering signal for positioning the host vehicle at the target lane position. The target lane position may comprise or consist of a target position for the host vehicle within the lane of travel (i.e. an intra-lane target position). The control system may be configured to reduce or remove the intra-lane steering signal when the host vehicle is at least substantially located at the target lane position. The target lane position may comprise or consist of a target intra-lane position for the host vehicle.

The steering wheel overlay signal may comprise or consist of a steering wheel torque overlay. The intra-lane steering signal may comprise or consist of an intra-lane steering torque for positioning the host vehicle at the target lane position.

According to a further aspect of the present disclosure there is provided a vehicle comprising a control system as described herein.

According to a further aspect of the present disclosure there is provided a method of controlling generation of a steering wheel overlay signal to control a trajectory of a host vehicle, the method comprising determining a principal axis of a lane of travel; determining a target trajectory for the host vehicle in dependence on the determined principal axis; and generating the steering wheel overlay signal. The steering wheel overlay signal may comprise an intra-lane steering signal for aligning the trajectory of the host vehicle with the target trajectory. The method may comprise reducing or removing the intra-lane steering signal when the trajectory is at least substantially aligned with the target trajectory. The method may comprise reducing or removing the steering wheel overlay signal when the trajectory is at least substantially aligned with the target trajectory.

The method may comprise determining at least a first boundary of the lane of travel. The principal axis may be determined as extending substantially parallel to the determined first boundary.

The method may comprise generating the steering wheel overlay signal to position the host vehicle at a predetermined distance from the first boundary.

The method may comprise generating the steering wheel overlay signal to position the host vehicle at a predetermined distance from the first boundary of the lane of travel.

The method may comprise determining opposing first and second boundaries of the lane of travel. The method may comprise determining the principal axis in dependence on the first and second boundaries. The principal axis may be determined in dependence the first or second boundary identified as being closest to the vehicle (for example, closest to a side of the vehicle or closest to a vehicle centreline). The principal axis may correspond to a centreline defined between the first and second boundaries.

The method may comprise generating the steering wheel overlay signal to position the host vehicle at a mid-point between the first and second boundaries.

The method may comprise determining the or each boundary of the lane of travel comprises identifying a road marking or a road edge.

The target trajectory may be substantially parallel to the principal axis of the lane of travel.

The steering wheel overlay signal may comprise a lane assist steering overlay or a road edge assist steering overlay for maintaining the host vehicle within the lane of travel. The intra-lane steering signal may be applied after the lane assist steering overlay or the road edge assist steering overlay.

The method may comprise generating the steering wheel overlay signal so as to position the host vehicle at a target lane position. The target lane position may comprise or consist of a target intra-lane position for the host vehicle. The method may comprise determining at least one boundary of the lane of travel; and determining a target lane position for the host vehicle in relation to the at least one boundary. The steering wheel overlay signal may comprise an intra-lane steering signal for positioning the host vehicle at the target lane position. The lane position may be defined in a transverse direction extending across the lane of travel, for example perpendicular to the principal axis of the lane of travel. The method may comprise reducing or removing the intra-lane steering signal when the host vehicle is at least substantially located at the target lane position.

According to a further aspect of the present disclosure there is provided a method of controlling generation of a steering wheel overlay signal to control positioning of a host vehicle, the method comprising determining at least one boundary of a lane of travel; and determining a target lane position for the host vehicle in relation to the at least one boundary. The method may include generating a steering wheel overlay signal comprising an intra-lane steering signal for positioning the host vehicle at the target lane position. The method may comprise reducing or removing the intra-lane steering signal when the host vehicle is at least substantially located at the target lane position. The target lane position may comprise or consist of a target intra-lane position for the host vehicle.

According to a further aspect of the present disclosure there is provided a non-transitory computer-readable medium having a set of instructions stored therein which, when executed, cause a processor to perform the method(s) described herein.

According to a yet further aspect of the present disclosure there is provided computer software that, when executed, is arranged to perform a method(s) as described herein.

According to a yet further aspect of the present disclosure there is provided a vehicle comprising a control system as described herein.

Within the scope of this application it is expressly intended that the various aspects, embodiments, examples and alternatives set out in the preceding paragraphs, in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the disclosure will now be described, by way of example only, with reference to the accompanying drawings, in which.

DETAILED DESCRIPTION

A control system 1 in accordance with an embodiment of the present disclosure will now be described with reference to the accompanying figures. The control system 1 is installed in a vehicle 2, referred to herein as the host vehicle 2. The host vehicle 2 in the present embodiment is an automobile, but it will be understood that the controller 1 may be used in other types of land vehicle. The host vehicle 2 is described herein with reference to a reference frame comprising a longitudinal axis X, a transverse axis Y and a vertical axis Z. The host vehicle 2 has a longitudinal centreline CL extending along the longitudinal axis X.

Figure 1:
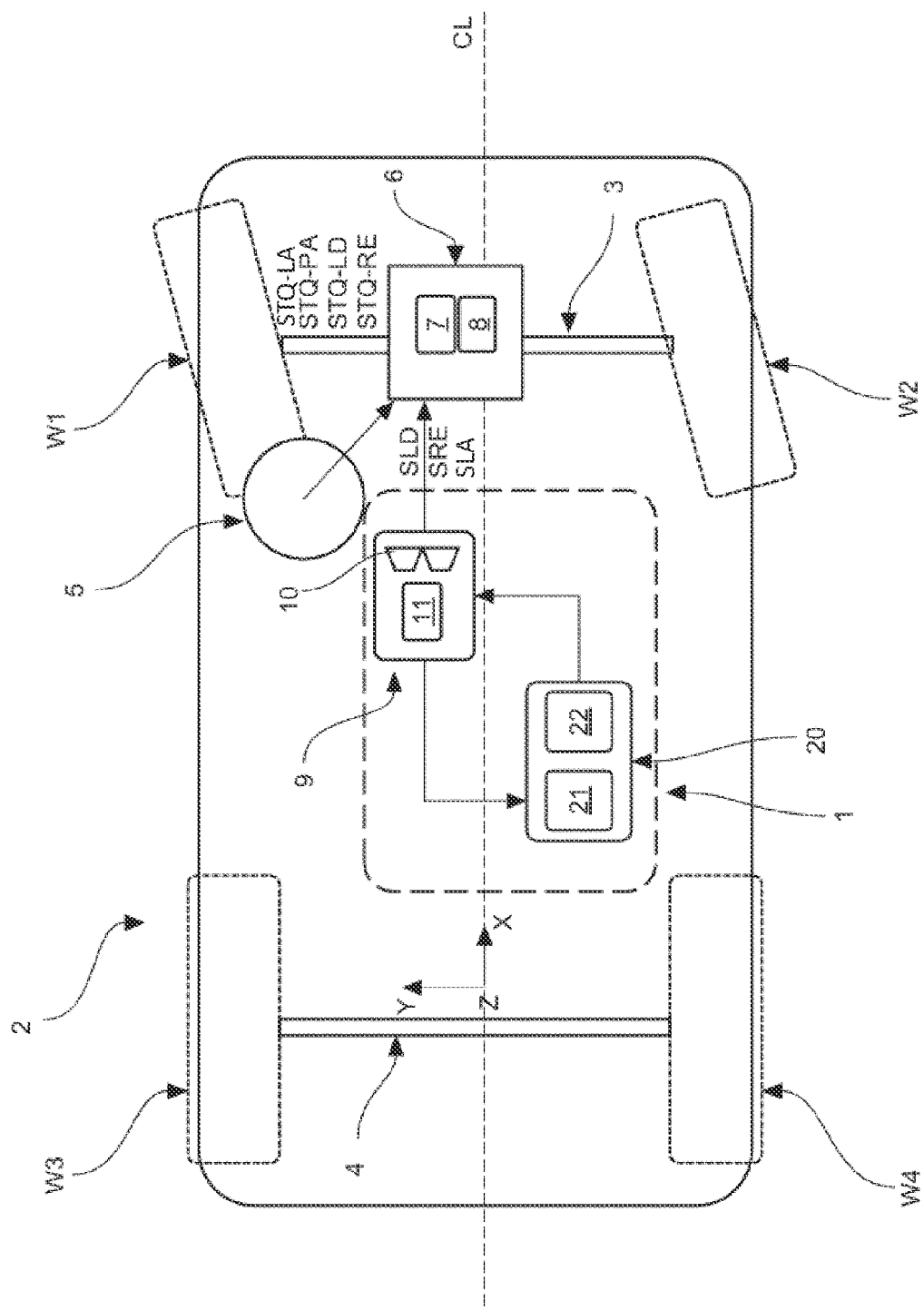
FIG. 1 shows a schematic representation of a host vehicle incorporating a control system in accordance with an embodiment of the present disclosure.

As illustrated in FIG. 1, the host vehicle 2 comprises four (4) wheels W1-4. The wheels W1-4 are provided on front and rear axles 3, 4. As illustrated in FIG. 1, the first and second wheels W1, W2 provided on the front axle 3 are steerable to control a direction of travel of the host vehicle 2. A driver-operated steering wheel 5 is provided for controlling a steering angle α of the first and second wheels W1, W2 provided on the front axle 3. A power assist steering system 6 is provided to generate a steering assist torque STQ-PA to supplement a steering torque applied STQ-D applied to the steering wheel 5 by the driver. The power assist steering system 6 comprises a power assist steering controller 7; a torque sensor (not shown) for sensing the steering torque applied by the driver to the steering wheel 5; and a power assist steering actuator 8 for generating the steering assist torque STQ-PA. In the present embodiment, the power assist steering system 6 is an electric power assist steering system (EPAS) comprising an electromechanical actuator operable to generate the steering assist torque STQ-PA. Other types of power assist steering actuator 7 may be used, such as a hydraulic actuator.

The host vehicle 2 comprises a lane departure warning system 9 for identifying when the host vehicle 2 is departing the host-vehicle lane of travel LT-n (i.e. the current lane in which the host vehicle 2 is travelling). As described herein, the lane departure warning system 9 is also suitable for identifying when the host vehicle 2 is approaching or traversing a physical limit or a boundary of the road R on which the host vehicle 2 is travelling. The physical limit or boundary of the road R is referred to herein as a road edge RE. The lane departure warning system 9 is configured to output a lane departure signal SLD upon making a determination that the host vehicle 2 is departing the host-vehicle lane of travel LT-n. The power assist steering system 6 is configured to generate a lane assist steering overlay STQ-LD in dependence on the lane departure signal SLD. The lane assist steering overlay STQ-LD in the present embodiment comprises or consists of a lane assist steering torque STQ-LD. The lane assist steering torque STQ-LD is applied as a steering wheel torque overlay to the steering assist torque STQ-PA generated by the power assist steering system 6. The lane departure warning system 9 is configured to output a road edge traversal signal SRE upon making a determination that the host vehicle 2 is approaching or traversing the road edge RE. The road edge traversal signal SRE comprises a steering torque request, a steering torque status signal and a road edge departure system status. The power assist steering system 6 is configured to generate a road edge assist steering overlay STQ-RE in dependence on the road edge traversal signal SRE. The road edge assist steering overlay STQ-RE in the present embodiment comprises or consists of a road edge assist steering torque STQ-RE. The road edge assist steering torque STQ-RE is applied as a steering wheel torque overlay to the steering assist torque STQ-PA generated by the power assist steering system 6. The lane departure warning system 9 is configured to output an intra-lane signal SLA comprising a target trajectory $\alpha_T$ of the host vehicle 2 in the host-vehicle lane of travel LT-n. The power assist steering system 6 is configured to generate an intra-lane steering signal STQ-LA in dependence on the intra-lane signal SLD. The intra-lane steering signal STQ-LA in the present embodiment comprises or consists of an intra-lane steering torque STQ-LA. The steering torque request may comprise a torque request direction (+ve or −ve) and optionally also a torque request magnitude. In a variant, the power assist steering system 6 may utilise steering angle to control the host vehicle 2. The intra-lane steering signal STQ-LA may comprise a steering angle signal.

The lane departure warning system 9 comprises a sensor unit 10 and an image processing module 11. The sensor unit 10 in the present embodiment comprises an optical camera having a field of view extending forwards in front of the host vehicle 2. The sensor unit 10 may comprise one or more optical cameras, for example a stereo camera. Alternatively, or in addition, the lane departure warning system 9 may utilise other types of sensor, such as a radar system or a LIDAR system, to capture an image of a region in front of the host vehicle 2. The sensor unit 10 in the present embodiment is located behind a rear-view mirror (not shown) provided at the top of the front windshield. Other mounting locations are possible, for example the sensor unit 10 may be provided behind or in a front grille of the host vehicle 2. The lane departure warning system 9 may optionally receive inputs from one or more vehicle systems, for example to determine if the driver has activated side indicators to signal an intended change the lane of travel LT-n. The lane departure warning system 9 may be configured to inhibit output of the lane departure signal SLD, for example if the driver activates the directional (side) indicators. The image processing module 11 receives image data captured by the sensor unit 10. The image data is processed to identify features of the road R on which the host vehicle 2 is travelling. The image data is also processed to detect the road edge RE, for example by identifying a transition or boundary between a road surface which may be relatively smooth (for example defined by asphalt, concrete or other surfacing material) and an adjacent surface which may be relatively rough (for example composed of one or more of the following: grass, mud, gravel, sand and snow).

Figure 2A:
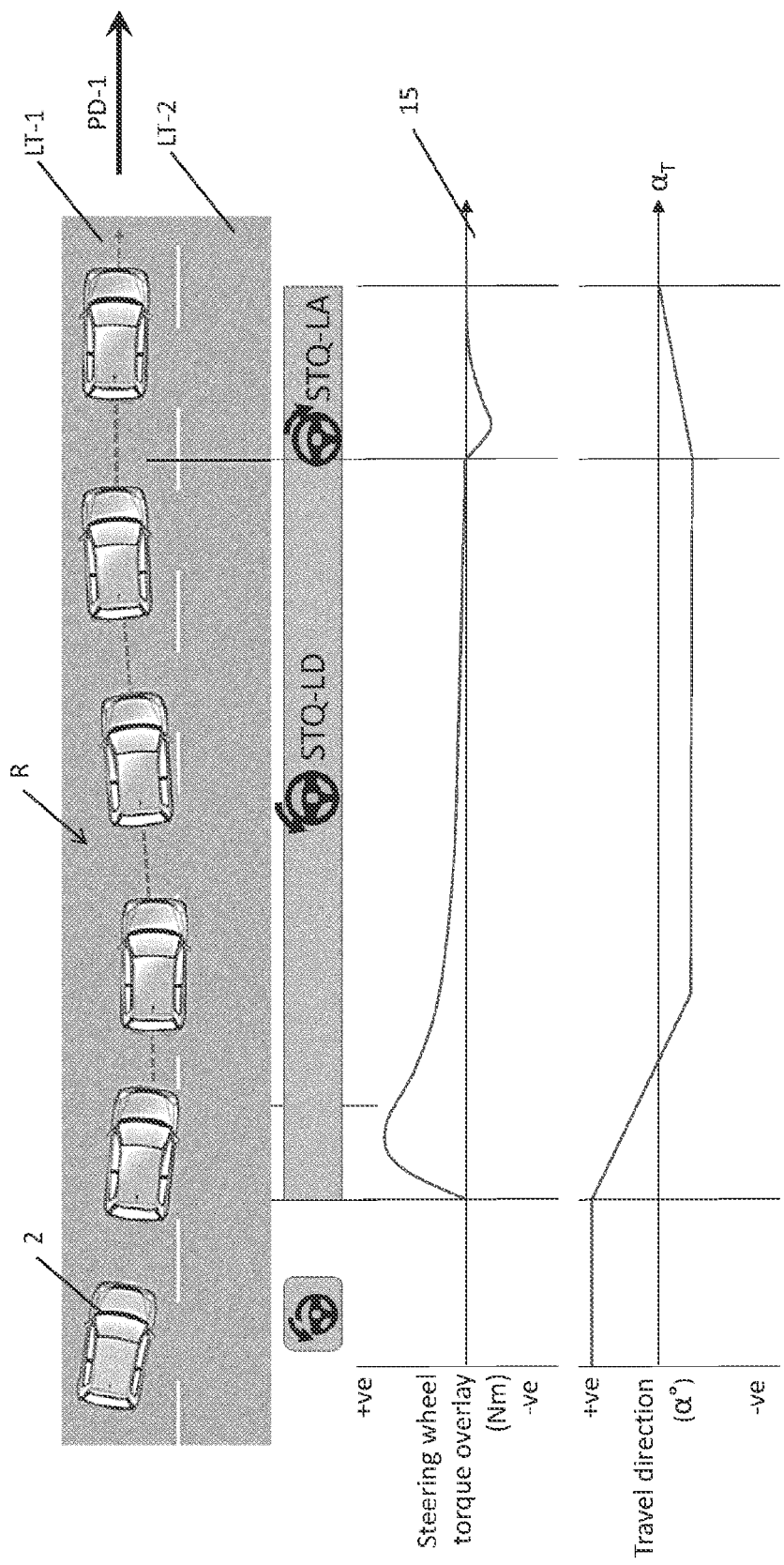
FIG. 2A illustrates generation of a lane keep assist torque and an intra-lane torque in a first scenario.

As illustrated in FIG. 2A, the power assist steering system 6 is operable to implement a lane keep assist (LKA) function in dependence on the lane departure signal SLD generated by the lane departure warning system 9. The power assist steering system 6 is operable also to implement an intra-lane (INLA) function in dependence on the intra-lane signal SLA generated by the lane departure warning system 9. In use, the power assist steering system 6 may generate a lane assist steering torque STQ-LD when it is determined that the host vehicle 2 is departing a lane of travel LT-n. The intra-lane steering torque STQ-LA is applied to align a trajectory α of the host vehicle 2 with a target trajectory $α_T$. In the present embodiment, the target trajectory α is aligned with a principal axis PD of the host-vehicle lane of travel LT-n. The intra-lane steering torque STQ-LA is applied after the lane assist steering torque STQ-LD. The intra-lane steering torque STQ-LA may, for example, be applied in dependence on a determination that the host vehicle 2 has returned to the host-vehicle lane of travel LT-n. The lane assist steering torque STQ-LD and the road edge assist steering torque STQ-RE are applied as a steering wheel torque overlay to the steering assist torque STQ-PA generated by the power assist steering system 6. The lane assist steering torque STQ-LD and the intra-lane steering torque STQ-LA are transmitted to the steering wheel 5 to provide a haptic signal to the driver of the host vehicle 2. The lane assist steering torque STQ-LD and the intra-lane steering torque STQ-LA are output to the steering wheel 5 in an appropriate direction to maintain the host vehicle 2 in the host-vehicle lane of travel LT-n. The magnitude of the lane assist steering torque STQ-LD and the intra-lane steering torque STQ-LA are controlled such that, if necessary, the driver can override the lane assist steering torque STQ-LD or the intra-lane steering torque STQ-LA, for example to implement a change in trajectory of the host vehicle 2 to implement a planned change in the lane of travel LT-n. The lane assist steering torque STQ-LD and the intra-lane steering torque STQ-LA may, for example, each have a maximum value of 3 Nm.

Figure 2B:
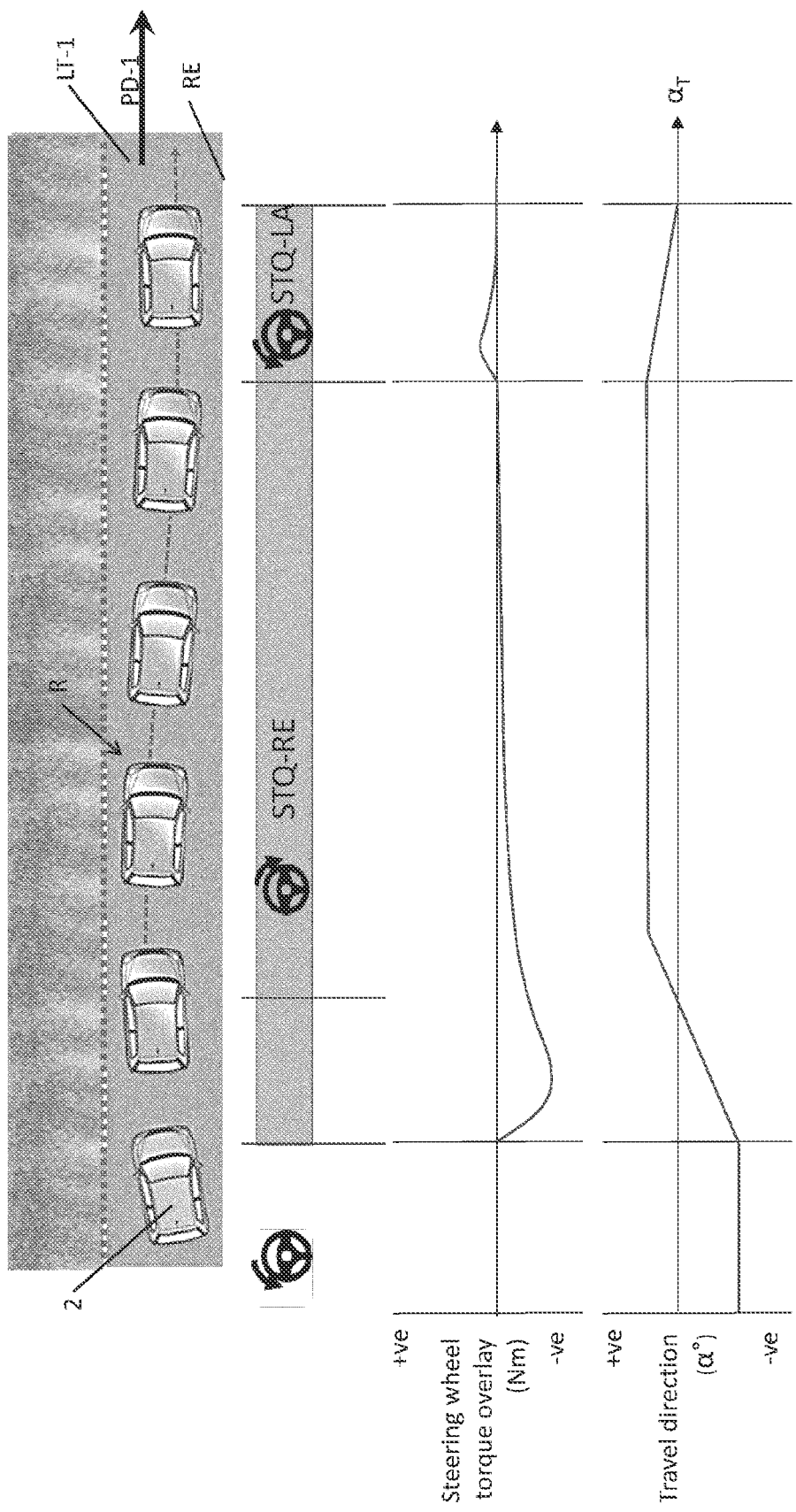
FIG. 2B illustrates generation of a road edge assist torque and an intra-lane torque in a second scenario.

As illustrated in FIG. 2B, the power assist steering system 6 is operable to implement a road edge lane keep assist (RE-LKA) function in dependence on the road edge traversal signal SRE generated by the lane departure warning system 9. The power assist steering system 6 is operable also to implement the intra-lane (LA) function in dependence on the intra-lane signal SLA generated by the lane departure warning system 9. The road edge lane keep assist (RE-LKA) function is intended as an emergency feature and steering assistance and warnings may be displayed when the function is intervening. For example, warnings may be displayed on a display screen. The road edge lane keep assist (RE-LKA) function implemented by the control system 1 can be selectively disabled/enabled by a driver of the host vehicle 2. However, in the present embodiment, the road edge lane keep assist (RE-LKA) function is enabled automatically when the ignition of the host vehicle 2 is switched on. The road edge lane keep assist (RE-LKA) function may operate independently of, or in conjunction with, the lane keep assist (LKA) function. As described herein, the control system 1 is configured to control operation of the road edge lane keep assist (RE-LKA) function. In use, the power assist steering system 6 may generate a road edge assist steering torque STQ-RE when it is determined that the host vehicle 2 is approaching or traversing the identified road edge RE. The intra-lane steering torque STQ-LA is applied to align a trajectory α of the host vehicle 2 with a target trajectory $α_T$. The trajectory α defines an angular orientation of the longitudinal axis X of the host vehicle 2. The trajectory α in the present embodiment is defined relative to a principal axis PD of the host-vehicle lane of travel LT-n. The target trajectory $α_T$ is aligned with a principal axis PD of the host-vehicle lane of travel LT-n. The intra-lane steering torque STQ-LA is applied after the road edge steering torque STQ-RE. The intra-lane steering torque STQ-LA may, for example, be applied in dependence on a determination that the host vehicle 2 has returned to the host-vehicle lane of travel LT-n. The road edge assist steering torque STQ-RE and the intra-lane steering torque STQ-LA are transmitted to the steering wheel 5 to provide a haptic signal to the driver of the host vehicle 2. The road edge assist steering torque STQ-RE and the intra-lane steering torque STQ-LA are output to the steering wheel 5 in appropriate directions to maintain the host vehicle 2 on the road. The road edge assist steering torque STQ-RE and the intra-lane steering torque STQ-LA are applied as a steering wheel torque overlay to the steering assist torque STQ-PA generated by the power assist steering system 6. The road edge assist steering torque STQ-RE provides a corrective steering input upon determination that the host vehicle 2 is traversing or is about to traverse a road lane boundary. If desired, the driver can override the road edge assist steering torque STQ-RE or the intra-lane steering torque STQ-LA by applying a steering torque STQ-D to the steering wheel 5 which is greater than or equal to a threshold override torque. The threshold override torque in the present embodiment is predefined as 3 Nm in either direction. It will be understood that the threshold override torque may be defined as a value less than 3 Nm or greater than 3 Nm. The magnitude of the road edge assist steering torque STQ-RE is controlled such that, if necessary, the driver can apply a steering torque to the steering wheel 5 to override the road edge assist steering torque STQ-RE, for example to implement a change in trajectory of the host vehicle 2 to pass another vehicle on the road. The road edge assist steering torque STQ-RE or the intra-lane steering torque STQ-LA may, for example, have a maximum value of 3 Nm.

Figure 3A:
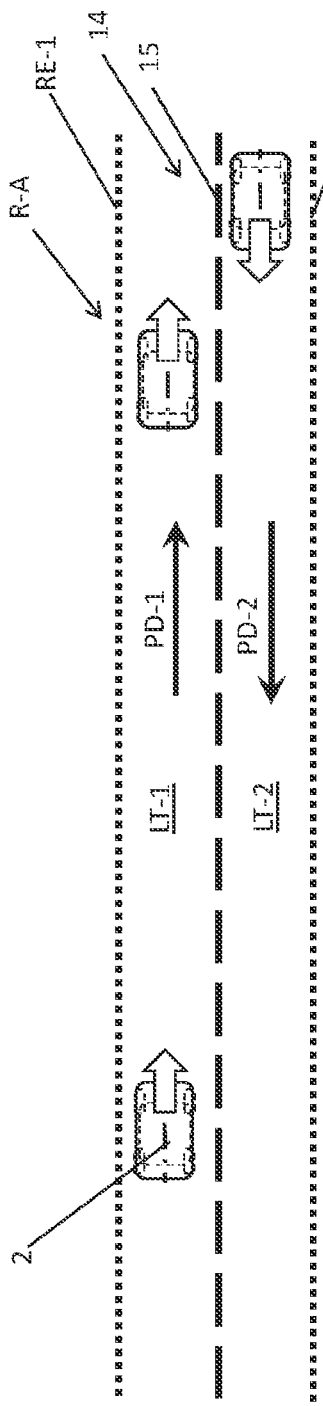
FIG. 3A illustrates the host vehicle travelling on a first section of road having a single lane of travel in each direction.
Figure 3B:
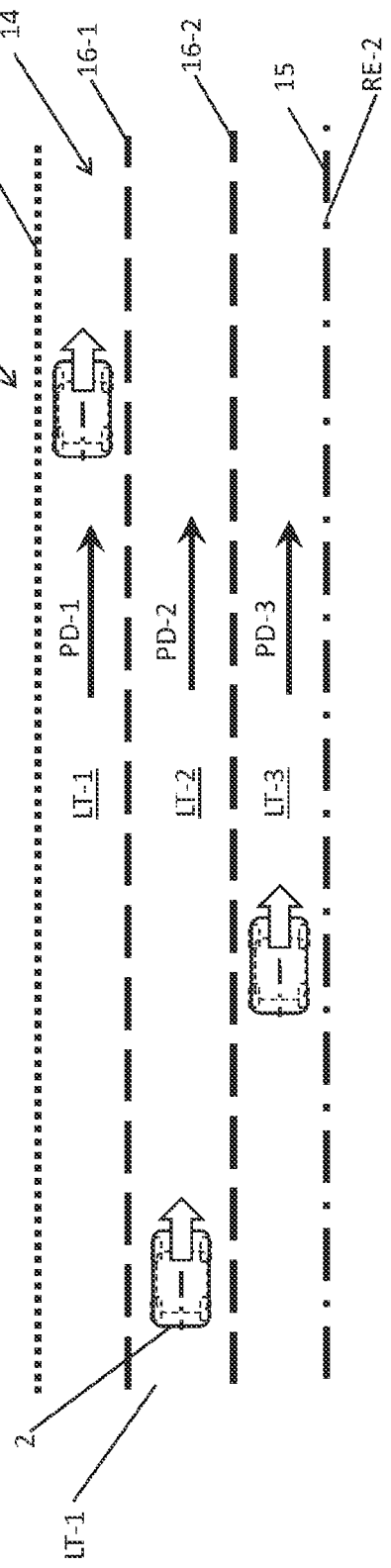
FIG. 3B illustrates the host vehicle travelling on a second section of road having a plurality of lanes of travel in each direction.

The control system 1 can be implemented when the host vehicle 2 is travelling on a road R having one or more lanes of travel LT-n. By way of example, a first road section R-A is shown in FIG. 3A; and a second road section R-B is shown in FIG. 3B. The first and second road sections R-A, R-B can form part of the same road R or may be separate roads R. The first road section R-A is a two-lane road (also known as a "two-lane highway") having first and second lanes of travel LT-1, LT-2 for vehicles travelling in respective first and second directions. The second road section R-B consists of a multiple-lane road (also known as a "multiple-lane highway") having a two or more lane of travel LT-n for vehicles travelling in the same direction. It will be understood that the present disclosure is not limited to operation on roads having the features illustrated in the first and second road sections R-A, R-B. The first and second road sections R-A, R-B each comprise first and second road edges RE-1, RE-2. In the illustrated example, the first and second road edges RE-1, RE-2 mark the lateral extent of the metalled road surface. It will be understood that one or both of the first and second road edges RE-1, RE-2 may comprise a barrier or partition member, for example separating lanes of a dual carriageway (also known as a "divided highway"). The first and second road sections R-A, R-B may also comprise road markings (denoted herein generally by the reference numeral 14). The first road section R-A has road markings 14 comprising a central road marking 15. As shown in FIG. 3B, the central road marking 15 comprise a centre line of the second road section R-B. The road markings 14 on the second road section R-B comprise one or more lane markings 16-*n* representing a boundary of a lane of travel LT-n for vehicles travelling in the same direction or in opposite directions. The one or more lane markings 16-*n* may comprise lane lines. In the illustrated arrangement, the second road section R-B comprises first and second lane markings 16-1, 16-2 for demarcating first, second and third lanes of travel LT-1, LT-2, LT-3. The central road marking 15 and/or the one or more lane marking(s) 16-n may each comprise a continuous line (not shown) or an interrupted line (shown in FIGS. 3A and 3B). The road marking(s) 14 may each comprise one line or multiple lines, for example in the form of a single line or a double line. The central road marking 15 typically differentiates between sections of the first or second road section R-A, R-B intended for travel in opposite directions. Alternatively, or in addition, the road marking(s) 14 may comprise edge lines to indicate an edge of an inboard lane; the edge lines may be separated from the associated first or second road edge RE-1, RE-2. The first road section R-A shown in FIG. 3A includes central road markings 15 and lane markings defining a plurality of lanes of travel LT-n.

The lane departure warning system 9 is operable to monitor the image data captured by the sensor unit 10 at least substantially in real time. The image processing module 11 analyses the image data to identify the first road edge RE-1 and/or the second road edge RE-2. The image processing module 11 may, for example, identify changes in the contrast and/or colour of the image data which may be indicative of the first and/or second road edge RE-1, RE-2. Other image processing techniques may be used to identify the first and second road edges RE-1, RE-2. The image processing module 11 is configured also to identify any road markings 14 present on the road R. The image processing module 11 may, for example, utilise image processing techniques to identify continuous or interrupted lines extending in a forward direction (i.e. parallel to the centre line CL of the host vehicle 2). The image processing module 11 is configured to identify the central road markings 15 and the lane markings 16. If road markings 14 are identified, the image processing module 11 identifies the lane of travel LT-n in which the host vehicle 2 is currently travelling (referred to herein as the host-vehicle lane of travel LT-n).

The image processing module 11 is configured to determine a principal axis PD of the lane of travel LT-n in which the host vehicle 2 is currently travelling. The principal axis PD represents a principal direction of travel for vehicles travelling in the lane of travel LT-n. The principal axis PD may be determined in dependence on one or more of the following: the first road edge RE-1, the second road edge RE-2, and the road marking(s) 14. The principal axis PD may, for example, be identified as a direction extending substantially parallel to the road edge RE-n, a central road marking 15 or a lane marking 16. The principal axis PD may be identified as a direction extending substantially parallel to a boundary of the lane of the travel LT-n which is closest to the host vehicle 2, for example closest to the centre line CL of the host vehicle 2). Alternatively, or in addition, the principal axis PD may be determined with reference to two or more features identified in the image data. For example, the principal axis PD may be determined as corresponding to a virtual centreline extending between a first road edge RE-1 and a central road marking 15; or a virtual centreline extending between first and second lane markings 16-1, 16-2. Alternatively, the principal axis PD may be offset from and extend parallel to a virtual centreline of the road R or the lane of travel LT-n. The image processing module 11 may optionally determine a centreline of the or each lane of travel LT-n. Alternatively, or in addition, the principal axis PD may be predefined, for example in map data.

The lane departure warning system 9 identifies the road marking 14 closest to the longitudinal centreline CL of the host vehicle 2. If the host vehicle 2 crosses the identified road marking 14, the lane departure warning system 9 determines that the host vehicle 2 is departing from the host-vehicle lane of travel LT-n. The lane departure warning system 9 then outputs the lane departure signal SLD. The lane departure signal SLD includes an indication of whether the host vehicle 2 is traversing the lane markings on a right-hand side or a left-hand side of the host vehicle 2. The power assist steering system 6 receives the lane departure signal SLD and is operable to generate the lane assist steering torque STQ-LD in a direction suitable for maintaining the host vehicle 2 in the host-vehicle lane of travel LT-n. The lane departure warning system 9 identifies the road edge RE-1, RE-2 closest to the longitudinal centreline CL of the host vehicle 2. If the host vehicle 2 approaches or crosses the identified road edge RE-1, RE-2, the lane departure warning system 9 determines that the host vehicle 2 has entered an activation zone and intervenes by outputting the road edge traversal signal SRE. The activation zone may be defined as a region within a predefined range of the identified road edge RE-1, RE-2. The road edge traversal signal SRE includes an indication of whether the host vehicle 2 is traversing the first road edge RE-1 disposed on a first side of the host vehicle 2, or the second road edge RE-2 disposed on a second side of the host vehicle 2. The power assist steering system 6 receives the road edge traversal signal SRE and is operable to generate the road edge assist steering torque STQ-RE in a direction suitable for maintaining the host vehicle 2 between the first and second road edges RE-1, RE-2.

Figure 4:
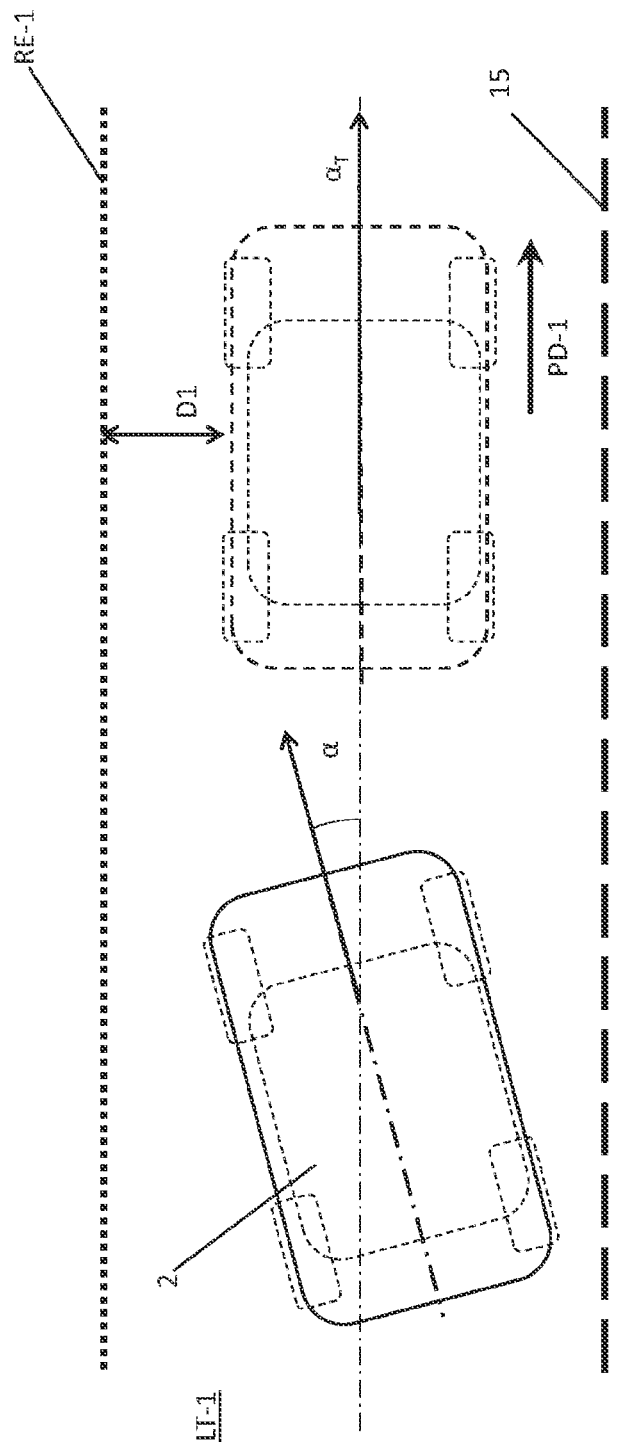
FIG. 4 illustrates the position and trajectory of the target vehicle in a lane of travel.

The power assist steering system 6 is operable to implement an intra-lane function following generation of the lane assist steering torque STQ-LD or the road edge assist steering torque STQ-RE. At least in certain embodiments, this may facilitate the transition to the scenario in which the host vehicle 2 is controlled exclusively by the driver. The intra-lane function is implemented by a steering wheel torque overlay comprising an intra-lane steering torque STQ-LA applied to the steering assist torque STQ-PA. In the arrangement illustrated in FIG. 2A, the control system 1 is configured to generate the intra-lane steering torque STQ-LA following application of the lane assist steering torque STQ-LD. In the arrangement illustrated in FIG. 2A, the control system 1 is configured to generate the intra-lane steering torque STQ-LA following application of the road edge assist steering torque STQ-RE. The intra-lane steering torque STQ-LA is generated to control the host vehicle 2 at least substantially to align a trajectory α (or orientation) of the host vehicle 2 with a target trajectory aT. In the present embodiment, the intra-lane steering torque STQ-LA is generated also to control the host vehicle 2 at least substantially to position the host vehicle 2 at a predefined position within the lane of travel LT-n. A target position and a target orientation for the host vehicle 2 are represented in FIG. 4 by a dashed (phantom) representation of the host vehicle 2. The target trajectory $α_T$ in the present embodiment is substantially parallel to the principal axis PD of the lane of travel LT-n. The intra-lane steering torque STQ-LA is transmitted to the steering wheel 5 and provides a haptic signal to the driver. The intra-lane steering torque STQ-LA is output to the steering wheel 5 in an appropriate direction to control the trajectory α of the host vehicle 2 at least substantially to match the target trajectory $α_T$. The intra-lane steering torque STQ-LA is generated in dependence on a comparison of a current trajectory α of the host vehicle 2 in relation to the principal axis PD. The control system 1 is configured to reduce the magnitude of the intra-lane steering torque STQ-LA as the trajectory α of the host vehicle 2 approaches the target trajectory α. The intra-lane steering torque STQ-LA may, for example, be reduced at least substantially to zero (0) when the trajectory α of the host vehicle 2 is at least substantially equal to the target trajectory $\alpha_T$. The magnitude of the intra-lane steering torque STQ-LA is controlled such that, if necessary, the driver can override the intra-lane steering torque STQ-LA, for example to implement a change in trajectory of the host vehicle 2 to implement a planned change in the lane of travel LT-n. The intra-lane steering torque STQ-LA may, for example, have a maximum value of 3 Nm. The intra-lane steering torque STQ-LA can be generated as a separate control function which is implemented upon completion of the lane assist steering torque STQ-LD or the road edge assist steering torque STQ-RE, for example as a continuation of these functions. In a variant, the intra-lane steering torque STQ-LA may be integrated into the lane assist steering torque STQ-LD or the road edge assist steering torque STQ-RE.

As outlined above, the intra-lane steering torque STQ-LA is generated to control the host vehicle 2 such that a target trajectory α is adopted. The intra-lane steering torque STQ-LA is reduced to zero (0) or removed when the trajectory α of the host vehicle 2 is at least substantially aligned with the target trajectory α. Indeed, since the intra-lane steering torque STQ-LA is applied after the lane assist steering torque STQ-LD or the road edge assist steering torque STQ-RE, it is envisaged that the steering wheel torque overlay will be reduced to zero (0) or removed when the trajectory α of the host vehicle 2 is at least substantially equal to the target trajectory $\alpha_T$. Under normal operating conditions, the host vehicle 2 is travelling along the road R when the intra-lane steering torque STQ-LA is removed. The control system 1 could be configured such that the speed of the host vehicle 2 is controlled at the same time as the intra-lane steering torque STQ-LA is applied. For example, the vehicle speed could be reduced or the host vehicle 2 brought to a halt concurrent with application of the intra-lane steering torque STQ-LA. This control strategy may be implemented in an emergency situation, for example if the driver has fallen asleep or is incapacitated. A driver monitoring system may monitor the driver to assess alertness and/or drowsiness. The control system 1 may communicate with the driver monitoring system to identify an emergency situation.

The control system 1 may be configured to generate the intra-lane steering torque STQ-LA to control the host vehicle 2 to a target position within the lane of travel LT-n (i.e. at a target lane position). The control system 1 may generate the intra-lane steering torque STQ-LA to position the host vehicle 2 at a predetermined distance D1 from a boundary of the lane of travel LT-n. The predetermined distance D1 may be defined relative to the centreline CL of the host vehicle 2 or relative to the side of the host vehicle 2 closest to the identified boundary. The boundary may, for example, correspond to the first or second road edge RE-1, RE-2 or a road marking 14. By way of example, the predetermined distance D1 is shown in relation to a first road edge RE-1 in the scenario illustrated in FIG. 4. Alternatively, the control system 1 may generate the intra-lane steering torque STQ-LA to position the host vehicle 2 centrally within the lane of travel LT-n. The intra-lane steering torque STQ-LA may be configured to position the host vehicle 2 at a mid-point between the first and second lane markings 16-1, 16-2 which define opposing sides of the lane of travel LT-n.

The control system 1 in an embodiment is configured to generate the intra-lane steering torque STQ-LA to control the host vehicle 2 at least substantially to align the trajectory α (or orientation) of the host vehicle 2 with a target trajectory a-c; and to control the host vehicle 2 at least substantially to position the host vehicle 2 at the target position within the lane of travel LT-n. The target lane position may, for example, be defined as a predetermined distance D1 from a boundary of the lane of travel LT-n. The control system 1 in this embodiment is configured to reduce the magnitude of the intra-lane steering torque STQ-LA as the trajectory α of the host vehicle 2 approaches the target trajectory α; and the position of the host vehicle 2 approaches the target lane position. The control system 1 may remove the intra-lane steering torque STQ-LA when the trajectory α of the host vehicle 2 is substantially equal to the target trajectory α; and the position of the host vehicle 2 is substantially equal to the target lane position.

Figure 5:
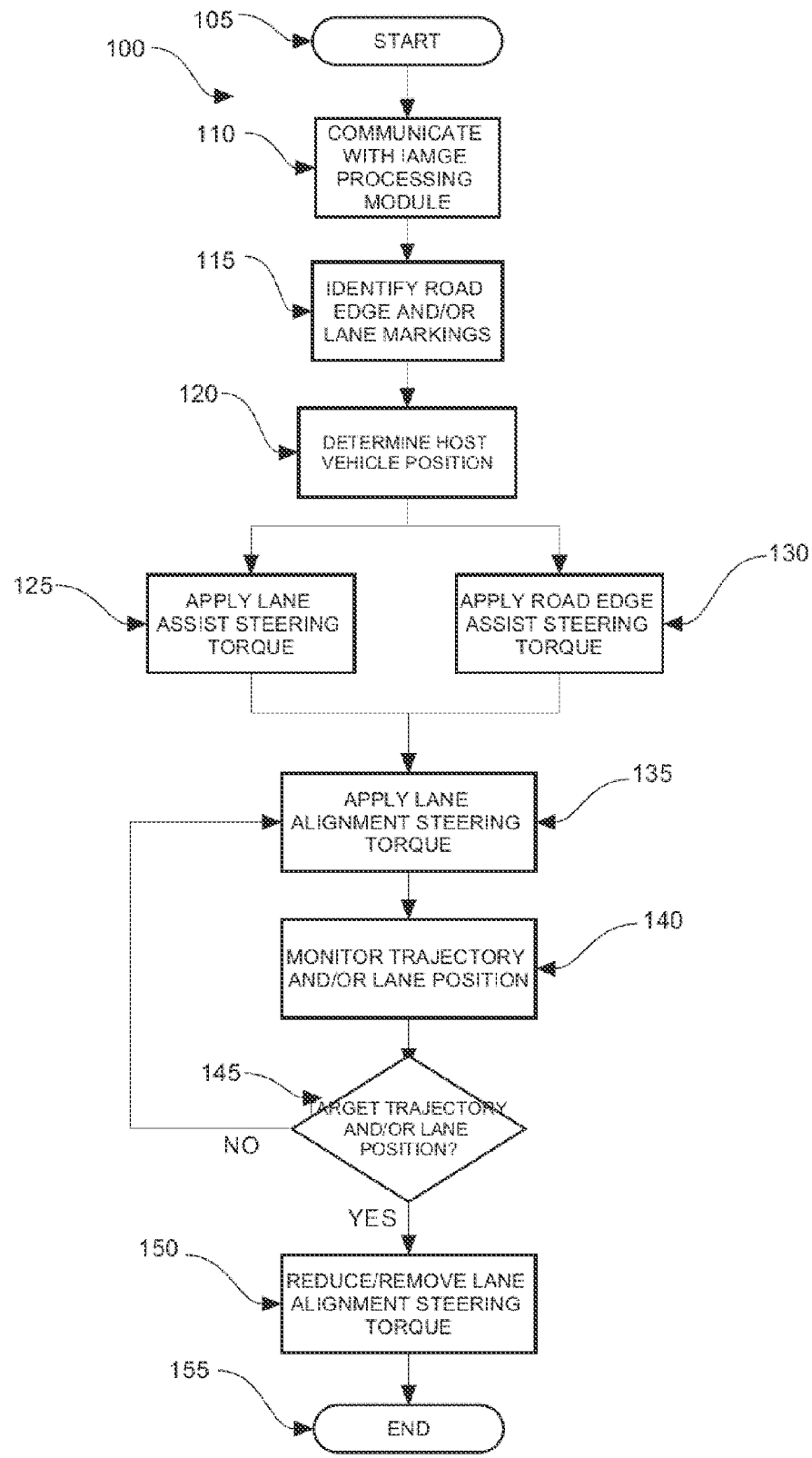
FIG. 5 shows a block diagram illustrating operation of the control system according to an embodiment of the present disclosure.

A block diagram 100 representing operation of the control system 1 is shown in FIG. 5. The control system 1 is activated (BLOCK 105). The control system 1 communicates with the image processing module 11 (BLOCK 110). The control system 1 interrogates the image processing module 11 to identify one or more road edge RE-n; and/or one or more road markings 14 (BLOCK 115). The control system 1 monitors the position of the host vehicle 2 relative to an identified road edge RE-n and/or the road markings 14 (BLOCK 120). If the control system 1 determines that the host vehicle 2 is traversing the road edge RE-n, the road edge assist steering torque STQ-RE is applied as a steering torque overlay (BLOCK 125). If the control system 1 determines that the host vehicle 2 is traversing the road markings 14, the lane assist steering torque STQ-LA is applied as a steering torque overlay (BLOCK 130). The control system 1 determines a principal axis PD of the host-vehicle lane of travel LT-n (BLOCK 135). A target trajectory $\alpha_T$ and/or a target position of the host vehicle 2 is determined in dependence on the determined principal axis PD (BLOCK 140). The intra-lane steering torque STQ-LA is applied as steering torque overlay (BLOCK 145). The intra-lane steering torque STQ-LA is reduced to zero (0) or removed when the trajectory α of the host vehicle 2 is at least substantially aligned with the target trajectory $\alpha_T$ and/or the host vehicle 2 is in the target position within the lane of travel LT-n (BLOCK 150). The process is performed continuously while the host vehicle 2 is travelling. The control system 1 is deactivated when the host vehicle 2 comes to a halt (BLOCK 155).

Figure 6:
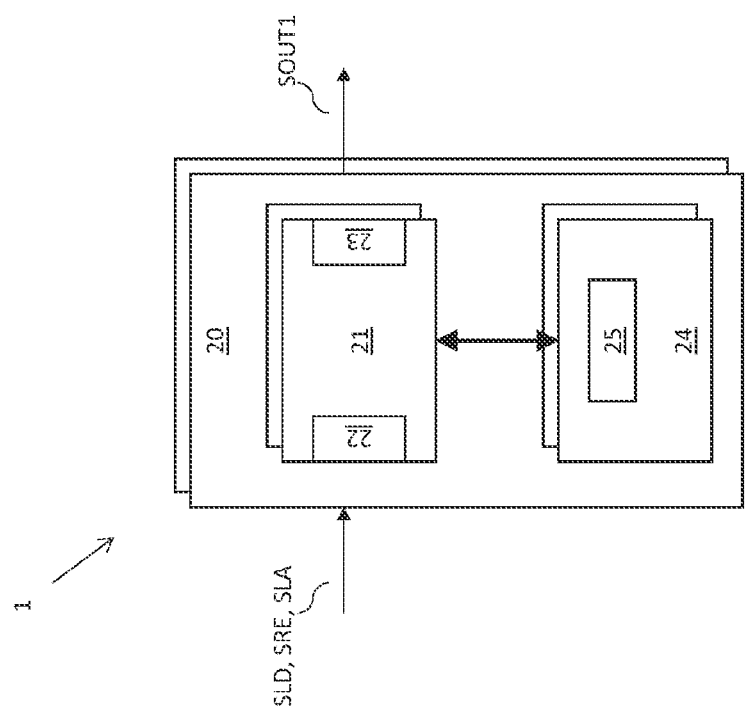
FIG. 6 is a schematic representation of the control system in accordance with an embodiment of the present disclosure.

With reference to FIG. 6, there is illustrated a simplified example of a control system 1 such as may be adapted to implement the method described herein. The control system 1 comprises one or more controllers 20 and is configured to control generation of a steering wheel overlay signal to control a trajectory α of a host vehicle 2. The control system 1 includes one or more controllers 20 and is configured to determine a principal axis PD of the lane of travel LT-n. The control system 1 determines a target trajectory $\alpha_T$ for the host vehicle 2 in dependence on the determined principal axis PD. The control system 1 generates the steering wheel overlay signal which includes an intra-lane steering signal STQ-LA for aligning the trajectory α of the host vehicle 2 with the target trajectory $\alpha_T$. The control system 1 removes the intra-lane steering signal STQ-LA when the trajectory α is at least substantially aligned with the target trajectory $\alpha_T$.

It is to be understood that the or each controller 20 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 20 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 20 to implement the control techniques described herein (including some or all of the functionality required for the method described herein). The set of instructions could be embedded in said one or more electronic processors of the controller 20; or alternatively, the set of instructions could be provided as software to be executed in the controller 20. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 6, the or each controller 20 comprises at least one electronic processor 21 having one or more electrical input(s) 22 for receiving one or more input signals, and one or more electrical output(s) 23 for outputting one or more output signals. The or each controller 20 further comprises at least one memory device 24 electrically coupled to the at least one electronic processor 21 and having instructions 25 stored therein. The at least one electronic processor 21 is configured to access the at least one memory device 24 and execute the instructions 25 thereon.

The, or each, electronic processor 21 may comprise any suitable electronic processor (e.g., a microprocessor, a microcontroller, an ASIC, etc.) that is configured to execute electronic instructions. The, or each, electronic memory device 24 may comprise any suitable memory device and may store a variety of data, information, threshold value(s), lookup tables or other data structures, and/or instructions therein or thereon. In an embodiment, the memory device 24 has information and instructions for software, firmware, programs, algorithms, scripts, applications, etc. stored therein or thereon that may govern all or part of the methodology described herein. The processor, or each, electronic processor 21 may access the memory device 24 and execute and/or use that or those instructions and information to carry out or perform some or all of the functionality and methodology describe herein.

The at least one memory device 24 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 20 have been described comprising at least one electronic processor 21 configured to execute electronic instructions stored within at least one memory device 24, which when executed causes the electronic processor(s) 21 to carry out the method as hereinbefore described. However, it is contemplated that the present disclosure is not limited to being implemented by way of programmable processing devices, and that at least some of, and in some embodiments all of, the functionality and or method steps of the present disclosure may equally be implemented by way of non-programmable hardware, such as by way of non-programmable ASIC, Boolean logic circuitry, etc.

It will be appreciated that various changes and modifications can be made to the present disclosure without departing from the scope of the present application.

The steering wheel overlay signal has been described herein as comprising or consisting of a torque request, for example comprising a torque direction and a torque magnitude. In a variant, the steering wheel overlay signal may comprise a steering angle signal for controlling the power assist steering system 6 to provide a target steering angle. The power assist steering system 6 may apply a steering torque overlay in dependence on the steering angle signal.

The invention claimed is:

1. A control system for controlling generation of a steering wheel overlay signal to control a trajectory of a host vehicle, the control system comprising one or more controllers, the control system configured to:
   determine a principal axis of a lane of travel;
   determine a target trajectory for the host vehicle in dependence on the determined principal axis, wherein the target trajectory is substantially parallel to the principal axis of the lane of travel;
   generate the steering wheel overlay signal, the steering wheel overlay signal comprising an intra-lane steering signal for aligning the trajectory of the host vehicle with the target trajectory; and one of a lane assist steering overlay and a road edge assist steering overlay for maintaining the host vehicle within the lane of travel;
   apply the intra-lane steering signal after application of the one of the lane assist steering overlay and the road edge assist steering overlay; and
   remove the intra-lane steering signal when the trajectory is at least substantially aligned with the target trajectory.

2. The control system as claimed in claim 1, wherein determining the principal axis comprises determining at least a first boundary of the lane of travel, the principal axis extending substantially parallel to the determined first boundary.

3. The control system as claimed in claim 2, wherein the control system is configured to:
   control generation of the steering wheel overlay signal to position the host vehicle at a predetermined distance from the first boundary.

4. The control system as claimed in claim 2, wherein determining the or each boundary of the lane of travel comprises identifying a road marking or a road edge.

5. The control system as claimed in claim 1, wherein determining the principal axis comprises determining opposing first and second boundaries of the lane of travel, the principal axis being determined in dependence on one or both of the opposing first and second boundaries.

6. The control system as claimed in claim 5, wherein the control system is further configured to:
   control generation of the steering wheel overlay signal to position the host vehicle at a mid-point between the opposing first and second boundaries.

7. A vehicle comprising the control system as claimed in claim 1.

8. A control system for controlling generation of a steering wheel overlay signal to control positioning of a host vehicle, the control system comprising one or more controllers, the control system configured to:
- determine at least one boundary of a lane of travel;
- determine a target lane position for the host vehicle in relation to the at least one boundary; and
- generate the steering wheel overlay signal, the steering wheel overlay signal comprising an intra-lane steering signal for positioning the host vehicle at the target lane position;
- wherein the control system is configured to reduce or remove the intra-lane steering signal when the host vehicle is at least substantially located at the target lane position.

9. A method of controlling generation of a steering wheel overlay signal to control a trajectory of a host vehicle, the method comprising:
- determining a principal axis of a lane of travel;
- determining a target trajectory for the host vehicle in dependence on the determined principal axis, wherein the target trajectory is substantially parallel to the principal axis of the lane of travel;
- generating the steering wheel overlay signal, the steering wheel overlay signal comprising an intra-lane steering signal for aligning the trajectory of the host vehicle with the target trajectory; and one of a lane assist steering overlay and a road edge assist steering overlay for maintaining the host vehicle within the lane of travel;
- applying the intra-lane steering signal after application of the one of the lane assist steering overlay and the road edge assist steering overlay; and
- removing the intra-lane steering signal when the trajectory is at least substantially aligned with the target trajectory.

10. A non-transitory computer-readable medium having a set of instructions stored therein which, when executed, cause a processor to perform the method according to claim 9.

11. A computer that, when executed, is arranged to perform the method according to claim 9.

* * * * *